United States Patent [19]
Bradbury et al.

[11] 3,941,684
[45] Mar. 2, 1976

[54] SCRAP SALVAGE SYSTEM

[75] Inventors: Christopher Grover Bradbury, Rumford, R.I.; Stanley Thomas Gotham, Somerset, Mass.; Joseph Paul Wudyka, Cumberland, R.I.

[73] Assignee: Leesona Corporation, Warwick, R.I.

[22] Filed: Mar. 11, 1974

[21] Appl. No.: 449,600

[52] U.S. Cl................ 209/3; 209/127 R; 209/143; 241/24; 241/40
[51] Int. Cl.²........................................ B03B 1/00
[58] Field of Search........... 209/133, 140, 141, 143, 209/145, 138, 139, 127 R, 127 A, 127 B, 127 C, 131, 3, 12; 55/462, 465, 392; 241/40, 60, 20, 24

[56] References Cited
UNITED STATES PATENTS

| | | | |
|---|---|---|---|
| 269,741 | 12/1882 | Taggart | 241/40 |
| 1,401,795 | 12/1921 | Kohler | 209/143 X |
| 1,484,208 | 2/1924 | Davis | 209/143 X |
| 1,700,713 | 1/1929 | Campion | 241/40 X |
| 1,997,125 | 4/1935 | Soyez | 209/127 B |
| 2,265,707 | 12/1941 | Wall | 55/462 X |
| 2,314,940 | 3/1943 | Hewitt | 209/127 R |
| 2,723,029 | 11/1955 | Lawver | 209/127 B |
| 2,754,965 | 7/1956 | Lawver | 209/127 B |
| 2,968,400 | 1/1961 | Clute | 209/143 |
| 3,074,653 | 1/1963 | Schosch | 241/60 X |
| 3,236,604 | 2/1966 | Pierson | 71/9 X |
| 3,308,944 | 3/1967 | Chamberlain | 209/3 |
| 3,312,342 | 4/1967 | Brown | 209/3 |
| 3,322,275 | 5/1967 | Breakiron | 209/127 R |
| 3,458,041 | 7/1969 | Schmid | 209/12 |
| 3,643,797 | 2/1972 | Berkowitz | 209/12 X |
| 3,749,322 | 7/1973 | Reynolds | 241/24 |

FOREIGN PATENTS OR APPLICATIONS

| | | | |
|---|---|---|---|
| 1,924,640 | 11/1970 | Germany | 209/129 |

*Primary Examiner*—Robert Halper
*Attorney, Agent, or Firm*—Burnett W. Norton

[57] ABSTRACT

A system for size reduction and separation of plastic-metal assemblies for the purpose of reclaiming the plastic and/or metal for reuse. The system includes a granulator followed by a fiber/dust separator with these components preferably being repeated, followed by a screening separator, and finally a hightension separator for separating plastic and metal. The system particularly incorporates an impact-counterflow separator for removing fiber/dust from heavier plastic and metallic particles.

22 Claims, 4 Drawing Figures

SCRAP SALVAGE SYSTEM

This invention relates in general to new and useful systems for size reduction and separation of plastic-metal assemblies for the purpose of reclaiming the plastic and/or metal for reuse.

BACKGROUND OF THE INVENTION

It is known to reclaim composite metal and plastic elements by first granulating the same and then, by means of suitable separators, to separate the metallic and plastic particles for reuse. However, prior systems lacked in purity of the separated components, which is extremely important for reuse, as well as efficiency.

SUMMARY OF THE INVENTION

In accordance with this invention, the elements which are to be reclaimed are first passed through a granulator and thereafter through a separator wherein fiber/dust is removed from the granulated particles. Thereafter, depending upon the construction of the materials or the elements to be reclaimed, the particles may be passed through one or more granulators and, when necessary, through at least one further fiber/dust separator.

The fiber/dust free particles, depending upon the product, may then be passed either directly to a high-tension electrostatic separator for separating the plastic and metallic particles, or the plastic and metallic particles may be directed to a screener wherein the finer particles are removed and delivered to the high-tension electrostatic separator with the larger particles being returned to a selected one of the granulators for reprocessing through the same system.

Also, in accordance with this invention, metallic particles may be removed at preselected stages in the system by means of magnetic separators. Further, where the metallic and plastic particles may be separated by screening, a certain degree of plastic and metallic particles separation may be effected at the screener.

A further feature of this invention is a novel impact-counterflow separator for removing fiber/dust from plastic and metallic particles. The impact-counterflow separator includes a housing into which fiber/dust and plastic and metallic particles entrained in air are delivered under pressure and impacted against a wall within the housing, preferably an inner surface of an exterior wall of the housing, with the impact being substantially normal to the wall and the wall being substantially vertical whereby the metallic and plastic particles lose their velocity and fall by gravity down along the wall and wherein a large portion of the fiber/dust remains entrained within the air.

The separator also includes a suction exhaust which is utilized to draw out the air and the fiber/duct entrained therewith. The housing is provided below the impact wall surface with a curved baffle which is positioned and so configurated wherein there is air flow over the particles falling over the baffle and wherein there is further separation of fiber/dust from the particles by the flowing air.

The separator may also be provided with an inlet duct which has an impact wall so as to initiate the separation of fiber/dust from the particles prior to the low thereof into the separator housing.

Where utilized above and hereinafter, the term "fiber/dust" is intended to cover "fiber and/or dust."

With the above and other objects in view which will hereinafter appear, the nature of the invention will be more clearly understood by reference to the following detailed description, the appended claims, and the several views illustrated in the accompanying drawings.

Figure 1:
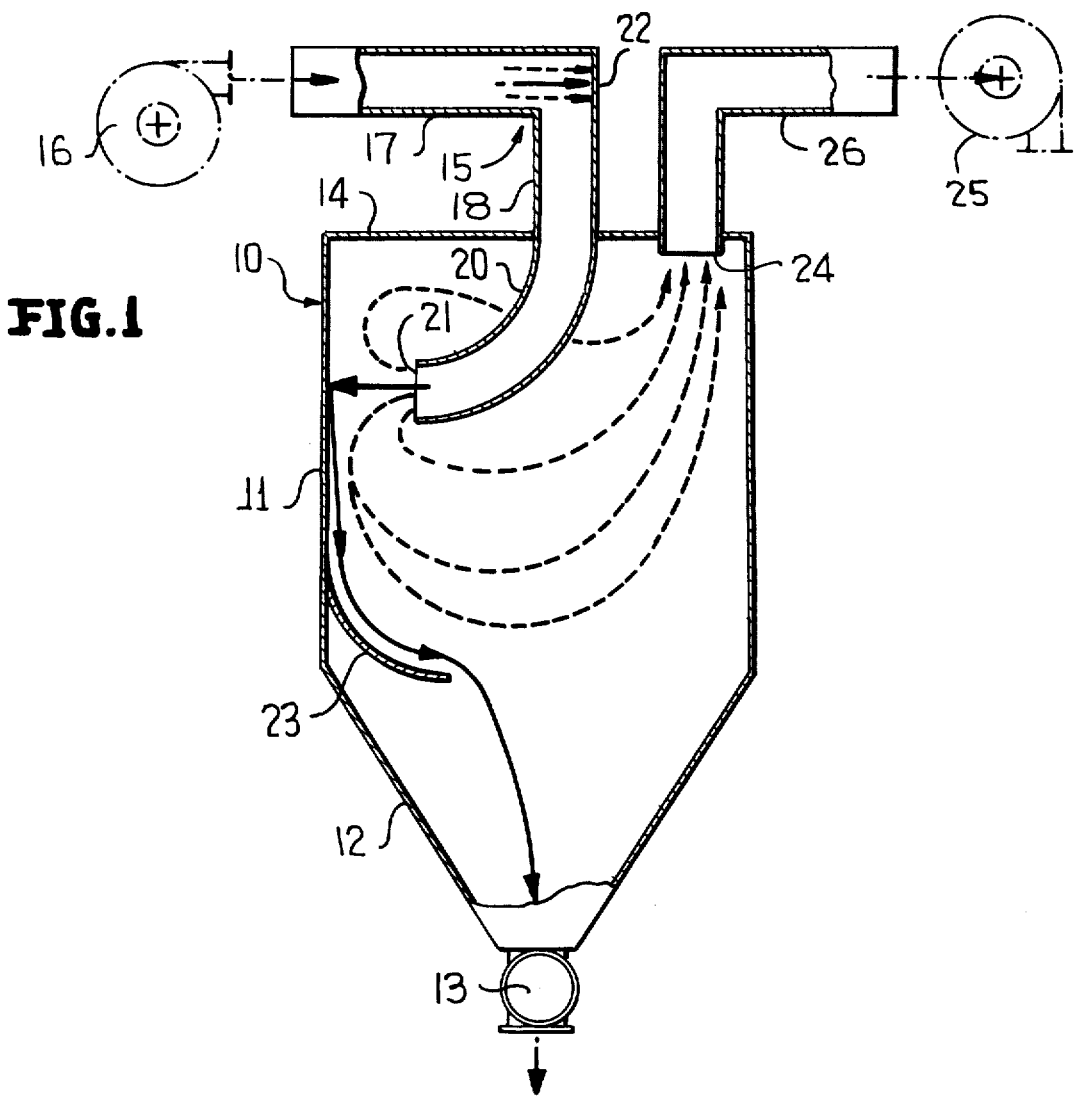
FIG. 1 is a vertical sectional view taken through a typical impact-counterflow separator formed in accordance with this invention.

Referring now to the drawings, FIG. 1 illustrates the impact-counterflow separator of this invention, generally identified by the numeral 10. The separator 10 includes an upright housing 11, which may be cylindrical, square or otherwise shaped. The housing 11 has a tapered lower chamber 12 which terminates in a discharge 13 which is preferably in the form of a rotary air lock.

The housing 11 also includes a top wall 14 through which there passes a portion of inlet duct which is generally identified by the numeral 15. The inlet duct 15 has coupled to an inlet thereof a blower 16 which, in turn, will be coupled to a granulator (not shown) or other source of granulated or comminuted material which is to be salvaged.

The inlet duct 15 includes a straight-run 17 which is preferably generally horizontally disposed and which is in abrupt intersection with a further straight-run 18 which is preferably vertically disposed. The straight-run 18 is fitted into the housing 11 through the top wall 14 thereof and is coupled to an internal duct 20 having a discharge opening 21 facing an external wall of the housing 11 in direct, opposed, spaced relation.

It is noted that the relationship of the duct sections 17 and 18 is such that directly opposing flow through the duct section 17 is an upstanding wall 22 of the duct section 18. Due to the effect of the blower 16, air at a predetermined pressure and moving at a predetermined velocity and having entrained therein fiber/dust and particles, normally both plastic and metallic, flows through the duct section 17 and generally impacts against the wall 22 with the particles, which are heavier than the air and the fiber/dust, particularly impacting against the wall 22 so as to effect an initial separation of the particles from the fiber/dust.

As the air and the entrained fiber/dust and particles pass out through the discharge opening 21, there is somewhat of a tendency for a counterflow of the air and the entrained fiber/dust while the heavier particles continue in a generally straight line direction and impact against the wall of the housing 11. The impaction of the particles against the wall of the housing 11 results in the loss of velocity of the particles with the further result that the particles fall down along the wall due to gravitational forces.

The particles are permitted to fall down along the wall of the housing 11 for a limited distance and thereafter flow over a curved baffle 23 which faces generally upwardly away from the impact surface of the wall of the housing 11 and generally towards a discharge opening 24 in the top wall 14. The position and shape of the baffle 23 is such that it influences the air flow within the housing 11 and effects a flow of air over the particles falling down the wall of the housing 11 and over the baffle 23 so as to effect a further removal of fiber/dust from the particles.

It is noted that removal of the air and entrained fiber/dust from the housing 11 is particularly facilitated by means of a second blower 25 which is connected to a discharge line 26 into which the discharge opening 24 opens. Thus, there will be a continuous flow of air through the housing 11, thereby preventing the settling out of the fiber/dust from the air and wherein a substantially complete removal of fiber/dust from the heavier particles is effected.

As will be apparent from FIG. 1, the heavier particles, generally plastic and metallic, will fall from the baffle 23 down into the tapered chamber 12 where the particles are moved through the discharge 13.

It is pointed out that a typical separator housing would have a four-foot diameter or cross-section with an air flow of 2,000 CFM and a capacity of 1,500 pounds of scrap per hour, with the preferred particle size being that passing a ⅛ inch screen opening.

Figure 2:
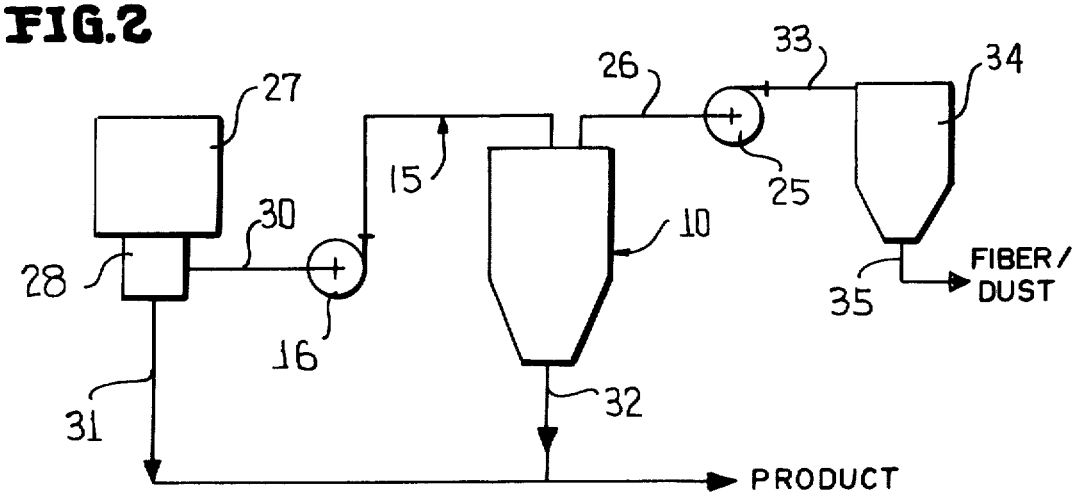
FIG. 2 is a schematic of a system utilizing the separator of FIG. 1.

Reference is now made to FIG. 2 wherein there is illustrated a typical usage of the impact-counterflow separator 10. Materials to be salvaged are passed through a conventional type granulator 27 wherein they are granulated or comminuted into a predetermined particle size, for example, particles which pass through ⅛ inch screen openings. A typical granulator is illustrated in Bulletin 73-G of Cumberland Engineering Company, Inc., Providence, R.I., with particular reference being made to the Series C granulating machines appearing on pages 14 through 17 thereof.

The granulated scrap from the granulator 27 passes into a three-stage aspirator-type separator 28 having a light fraction discharge 30 and a heavy fraction discharge 31. The light fraction discharge 30 is coupled to the inlet of the blower 16 and is directed thereby into the impact-counterflow separator 10 in which fiber/dust is removed and the heavier particles are discharged into a discharge line 32 which is coupled to the heavy fraction discharge 31 and wherein the particles pass onto other equipment, as will be described hereinafter, for possible further granulating and for separation.

The suction blower 25 has a discharge duct 33 which is connected to a conventional cyclone-type separator 34 which removes fiber/dust from the air and discharges the same as at 35. Depending upon the nature of the fiber/dust, the same may be considered as waste or may be subject to suitable salvaging.

Figure 3:
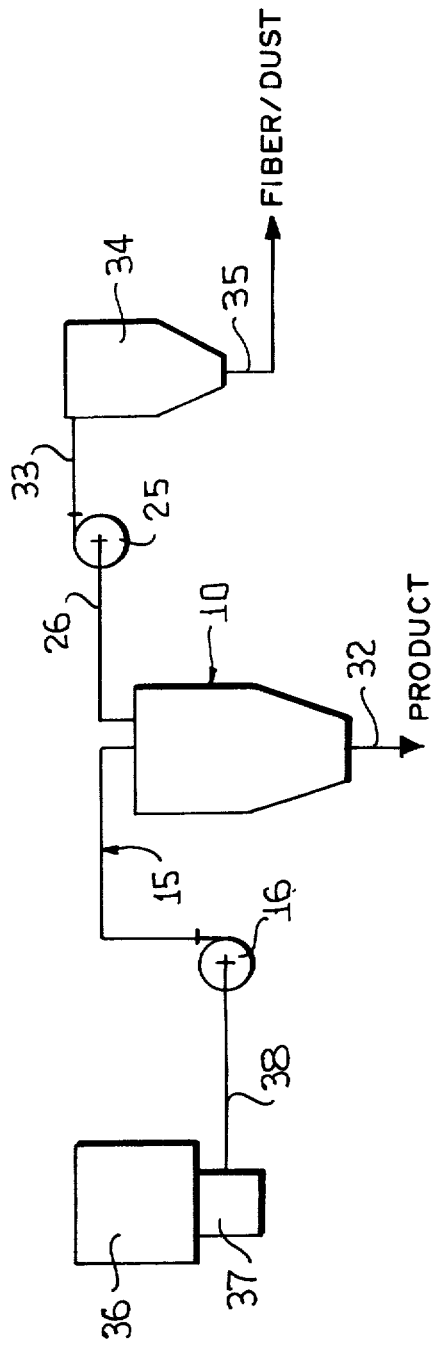
FIG. 3 is a schematic of another system utilizing the separator of FIG. 1.

Reference is now made to a further typical usage of the impact-counterflow separator 10. The system of FIG. 3 is very similar to that of FIG. 2 and differs therefrom primarily in that it includes a granulator 36 having a conventional airvey discharge 37 which is coupled by means of a duct 38 to the inlet end of the blower 16. The granulator 36 may be of the same as the aforedescribed granulator 27 and the operation of the system will be the same as that of FIG. 2 except for the fact that all of the discharge of the granulator 36 will be directed into the impact-counterflow separator 10 and that the particles discharged from the impact-counterflow separator 10 through the discharge line 32 will be all of the particle discharge of the system. The particle discharged will, as in the case of the system of FIG. 2, be directed to possibly other granulating and fiber/dust separating means, as well as particle separating means.

A number of sets of materials have been processed successfully through the impact-counterflow separator system. The overall application and the specific separation performed by this system are as follows:

| APPLICATION | MATERIALS SEPARATED |
|---|---|
| 1. scrap telephone cordage | nylon fiber from PVC, nylon and bronze particles |
| 2. fine wire | fiber and paper from wire and plastic/rubber insulation particles |
| 3. general wire | fiber and paper from wire and plastic/rubber insulation particles |
| 4. reinforced garden hose | nylon/rayon fibers from PVC particles |
| 5. plated plastics | dust from plated and unplated ABS particles |
| 6. used plastic textile spools with yarn ends remaining | fibers from plastic particles |
| 7. telephone cord end strippings | mica dust (stripping agent) from PVC particles |

It is obvious that the separation system is not limited to the above-listed material sets.

Figure 4:
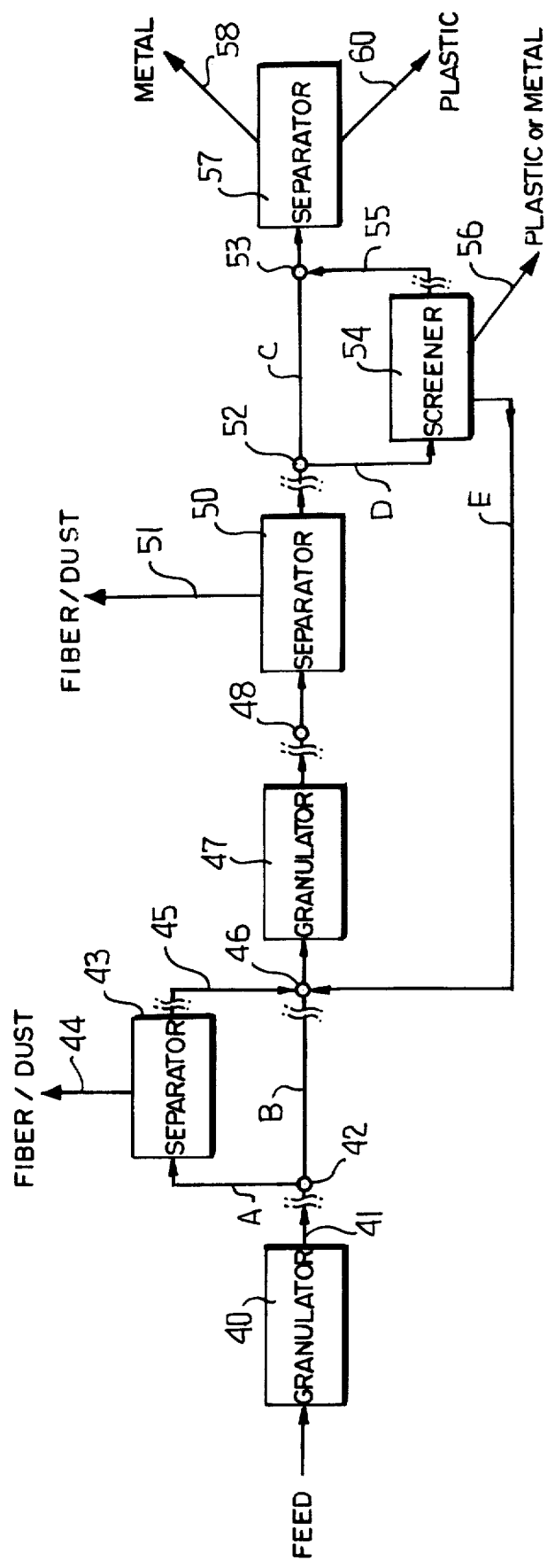
FIG. 4 is a process schematic of an ideal salvage system in accordance with this invention.

Reference is now made to FIG. 4 wherein there is specifically disclosed an overall salvage process. In accordance with the illustrated schematic, scrap to be salvaged is fed into a conventional granulator 40 which may correspond to the granulator 27 of FIG. 2. Granulated scrap passes from the granulator 40 through a duct 41, preferably by means of a blower, such as illustrated in FIG. 2, to a junction point 42 wherein, depending upon the system, the granulated scrap may pass along either path A or path B. It is to be noted that, depending upon the desired particle size, the granulated scrap passing from the granulator 40 may pass into another and similar granulator which will reduce the particle size.

The granulated scrap, when it passes along path A from the junction point 42, passes through a separator 43 which is preferably in the form of an impact-counterflow separator, such as the impact-counterflow separator 10 in FIG. 1. In the separator 43, fiber/dust is removed from the heavier particles and discharged through line 44. The heavy particles discharged from the separator 43 passes through a line or duct 45 to a junction point 46.

It is also pointed out that path A may include more than one of the separators 43 in series so as to insure proper fiber/dust removal. Further, while the impact-counterflow separator 10 of FIG. 1 is preferred, it is to be understood that under certain operating conditions a conventional cyclone-type separator may be utilized.

If the granulated scrap material passes along path B, it may pass directly to junction point 46. On the other hand, if it is feasible to remove metallic particles prior to the junction point 46, a conventional magnetic separator (not shown) may be incorporated in either path A or in path B in advance of junction point 46.

From the junction point 46 flow is into a further granulator 47 which may be of the same type as the granulator 40, but with a smaller screen size. If necessary, an additional granulator may be placed in the series with the granulator 47. Flow from the granulator 47 is to a junction point 48.

Flow from the junction point 48 is to a further separator 50 wherein there is a further separation of fiber/dust from heavier particles. Once again, if desired, an additional separator corresponding to the separator 50 may be incorporated in the system. The separator 50 is preferably of the impact-counterflow type, but under certain operating and material conditions could be of the conventional cyclone-type. Removed fiber/dust passes from the separator 50 through a discharge 51. Scrap particles pass from the separator 50 to a junction point 52. However, if the scrap product is of a suitable type, there may be incorporated in the system in advance of the junction point 52 a conventional magnetic separator for removing metallic particles from the granulated scrap.

Scrap flow from the junction point 52 may be through a path C or a path D. Scrap flow along path C is directly to a junction point 53 where scrap flow along the path D is to a screener 54 wherein the screening of the particles is effected and finer particles pass along a line 55 to the junction point 53, whereas larger particles pass along a path E and are returned into the system at junction point 46 for further granulation and repeated processing. The screener 54 may also have incorporated therein under suitable particle conditions a separator arrangement for separating either selected plastic or selected metal particles which are discharged along a discharge path 56.

Suitable screeners are manufactured by the Syntron Division of FMC Corporation, Homer City, Pa., and described in their Bulletin 220571.

At this time it is to be noted that more than one of the screeners 54 may be arranged in series along the path D.

The granulated scrap passes from junction point 53 to a high-tension separator 57 which is of the conventional type and wherein the metal particles and plastic particles are separated and suitably discharged along a metal particle discharge 58 and a plastic particle discharge 60. The high-tension separator is an electrostatic separator and may be of the type manufactured by CARPCO Research and Engineering, Inc., Jacksonville, Fla., and described in Bulletin No. HPB114. Separators of this type are also disclosed in U.S. Pat. Nos. 3,322,275 and 3,370,703.

It is to be understood that with the process schematic of FIG. 4 numerous flow paths are feasible. The various processing steps will be incorporated, omitted, or repeated depending upon the particular product which is being salvaged. Accordingly, no attempt will be made here to specifically define specific flow paths. However, the system in general will be reviewed here so that one skilled in the art can determine the most feasible flow path for a particular product to be salvaged.

The initial step is to reduce the material to be salvaged from a non-uniform bulky size to a flow of more uniform particles by using the granulator 40. The flow of particles from the granulator 40 can then follow one of two flow paths. Path A introduces the material to a separation system (separator 43) where fibers and/or dust are removed. The other, path B, carries the material directly to another granulator 47. The choice between these process paths is determined by the presence or absence of dust and/or fines created by the size reduction of the scrap material being salvaged in the granulator 40.

The second stage of granulation, granulator 47, reduces the particles to a more uniform size. During the granulation steps within the granulators 40 and 47, liberation occurs if the bonds between materials are significantly weaker than the bonds within the materials themselves. The term "liberation" is used to signify that the attachment between materials has been eliminated and the individual particles are of homogenous composition. The case of bonds between materials being stronger then those within each of the materials changes the parameters of the granulating steps. For this situation, the materials are reduced to the smallest particle size practical through granulation to facilitate separation and maximum yields and purity. Thus, the parameters for granulating vary among sets of materials, depending principally on bonding and physical sizes of the actual assemblies and the components of those assemblies.

The materials from the final stage of granulation, granulator 47, are then processed through a separator where fiber and/or dust caused by granulation are removed.

At this point the two schematic paths C and D are available. Completed liberated materials or materials reduced to relatively small particle sizes may be conveyed along path C directly to the high-tension separator 57. On the other hand, partially liberated materials are conveyed along path D to the screener 54. The screener 54 then separates liberated from unliberated particles by size parameters. The liberated mixture of particles of plastic and metal are conveyed to the high-tension separator 57. Unliberated particles, again sorted by size using the screener 54, are recycled in the process along the path E. These particles are regranulated in the granulator 47 and reprocessed.

If a homogenous product can be removed by the screener 54, it is discharged from the system at this point. It is to be noted that the screener 54 is particularly suited for the separation of the plastic and metal contained in small diameter wire.

As described above, the separator 57 is a high-tension separator wherein the mixture of individually homogenous particles are separated on the basis of conductivity or non-conductivity. The non-conductive particles are charged in an ionizing field, formed dipoles within the individual particle, and are segregated in a high-voltage electrostatic field. The products discharged from this are high purity plastics and high purity metals.

Typical examples of scrap which has been successfully salvaged with the process of FIG. 4 are small diameter wire and refrigerator parts with metal plating on ABS (acrylonitrile-Butadiene-Styrene) plastic. The small diameter wire has been separated from its plastic insulation with exceptional purity and very high yields. Purities of better than 99 percent and yields of 97 percent have been accomplished. The scrap wire was passed through the granulator 40, the separator 43, the granulator 47, the separator 50, the screener 54, and the separator 57.

With respect to the metal plated ABS, this scrap was passed through the granulator 40 directly to the granulator 47, then through the separator 50, and then directly to the separator 57. Ninety-eight to ninety-nine percent purity and 80 to 90 percent yield of the reclaimed ABS has been obtained. The reclaimed ABS has been successfully tested for mechanical properties and has been successfully replated, demonstrating its purity and usefulness after being reclaimed.

Although only a preferred embodiment of the separator and only several preferred embodiments of separator systems have been specifically disclosed and illustrated herein, it is to be understood that minor variations may be made in the separator construction and the separator systems without departing from the stated scope of the invention, as defined by the appended claims.

What is claimed as new:

1. An impact-counterflow separator for removing fiber/dust from heavier particles comprising, a housing, an inlet duct leading into said housing and operable to receive pressurized air and entrained fiber/dust and heavier particles, said housing having an upright wall, means for effecting pressurized air flow into said housing through said inlet duct to thereby convey said fiber/dust and particles to said housing, said inlet duct having a discharge opening directed towards and substantially normal to said upright wall, said upright wall being spaced from said discharge opening, means for controlling the air flow pattern as the air is emitted from said discharge opening to effect impaction of the particles against said upright wall and at least momentarily reduce the velocity of the particles to substantially zero with the fiber/dust being substantially precluded from impaction with said upright wall to thereby gravitationally substantially separate the particles from said fiber/dust, baffle means below said upright wall for receiving descending particles and fiber/dust, said baffle means cooperating with said means for controlling the air flow pattern to effect removal of fiber/dust from descending particles, and said means for controlling the air flow pattern being operable to remove the separated fiber/dust from said housing.

2. The separator of claim 1 wherein said means for controlling said air flow is suction means.

3. The separator of claim 2 wherein said suction means includes an outlet from said housing, said housing outlet being vertically spaced relative to said discharge opening.

4. The separator of claim 3 wherein said baffle means includes a portion facing towards said outlet.

5. The separator of claim 1 wherein said means for controlling the air flow pattern includes suction means connected to an outlet of said housing, said housing outlet being vertically spaced relative to said discharge opening and remote therefrom in a direction opposite from the direction of discharge therefrom.

6. The separator of claim 1 wherein said baffle means is a continuation of said upright wall.

7. The separator of claim 1 wherein said inlet duct includes an abrupt turn defining a duct wall disposed substantially normal to the flow of air and fiber/dust and particles directed toward said duct wall, said duct wall forming an impact surface for fiber/dust and particles to reduce the velocity thereof.

8. The separator of claim 1 wherein said means for effecting pressurized air flow includes a blower, and said blower includes an inlet connected to an outlet of a granulator.

9. The separator of claim 8 wherein said granulator outlet receives the entire production of said granulator.

10. The separator of claim 8 wherein said granulator includes separator means for separating material granulated thereby into heavy fractions and light fractions, said granulator having separate discharges for heavy fractions and light fractions, and said light fractions discharge being said granulator outlet to which said blower is connected.

11. The separator of claim 10 including discharge means coupled to said heavy fractions discharge and said discharge for separated particles for receiving heavy fractions and particles therefrom.

12. A method of salvaging granulated materials of the type including fiber/dust and heavier particles comprising the steps of, entraining the fiber/dust and heavier particles in an air stream, moving said fiber/dust in a selected path in said air stream, impinging said fiber/dust and particles against a surface generally normal to said selected path to change the direction of movement and initiate separation of the fiber/dust and particles, thereafter flowing the same into an enclosure while controlling the air flow pattern under a suction induced air current as the fiber/dust and heavier particles enter the enclosure to effect impingement of the particles against an upright wall substantially normal thereto thereby reducing the momentum of the particles with the particles falling from the upright wall under the influence of gravity while the fiber/dust is substantially precluded from impingement against the upright wall, and removing the air and fiber/dust in said suction induced air current.

13. The method of claim 12 wherein after impinging against said wall the falling particles and a portion of the air are directed along a generally common path wherein fiber/dust falling with the particles may be separated therefrom.

14. The method of claim 12 wherein said granulated materials are formed as a continuous part of said method.

15. A process for salvaging the materials of composite metallic and plastic members to yield fiber/dust and heavier particles of metal, and plastic comprising the steps of granulating the members, entraining the fiber/dust and particles in a stream of air to flow the same into an enclosure while controlling the air flow pattern under a suction induced air current as the fiber/dust and particles enter the enclosure to effect impingement of the particles against an upright wall substantially normal thereto thereby reducing the momentum of the particles with the particles falling downwardly under the influence of gravity while the fiber/dust is substantially precluded from impingement against the upright wall, removing the fiber/dust in said air stream, and finally separating the plastic from the metallic particles.

16. The process of claim 15 wherein the plastic and metallic particles are separated into large and small particles in advance of the separation of the plastic particles and metallic particles with the large particles being returned for further granulation, further fiber/dust separation, and only the selected small particles are separated as to plastic and metallic particles.

17. The process of claim 15 wherein there is a further granulating of the plastic and metallic particles having fiber/dust separated therefrom, followed by a further separation of fiber/dust from the plastic and metallic particles.

18. The process of claim 17 wherein following the further separation the plastic and metallic particles are separated into large and small particles in advance of the separation of the plastic particles and metallic particles with the large particles being returned for further granulation, further fiber/dust separation, and only the selected small particles are separated as to plastic and metallic particles.

19. The process of claim 17 wherein there is a removal of metallic particles prior to the further granulating.

20. The process of claim 15 wherein in the granulating of the members there is a first granulation to a first particle size and a second granulation to a second and smaller particle size.

21. The process of claim 20 wherein there is a removal of metallic particles between said first granulation and said second granulation.

22. An impact-counterflow separator for removing fiber/dust from heavier particles comprising, a housing, an inlet duct leading into said housing, said housing having an upright wall, means for effecting flow of pressurized air in a path through said duct to convey the fiber/dust and particles to said housing, said inlet duct having an abrupt turn defining a duct wall disposed substantially normal to said path, said inlet duct having a discharge opening directed toward and substantially normal to said upright wall, said upright wall being spaced from said discharge opening, said fiber/dust and said particles moving in said path impacting against said duct wall to reduce the velocity and direct said fiber/dust and particles toward said discharge opening, means for controlling the air flow pattern as the air is emitted from said discharge opening to effect impaction of the particles against said upright wall and reduce the velocity thereof with the fiber/dust being substantially precluded from impaction against said upright wall to thereby gravitationally substantially separate the particles from the fiber/dust, and said means for contolling the air flow pattern being operable to remove the fiber/dust from said housing.

* * * * *